United States Patent Office

2,706,181
Patented Apr. 12, 1955

2,706,181

CATALYSTS FOR THE POLYMERIZATION OF OLEFIN OXIDES

Malcolm E. Pruitt, Lake Jackson, and Joseph M. Baggett, Freeport, Tex., assignors to The Dow Chemical Company, Midland, Mich., a corporation of Delaware No Drawing. Application June 5, 1952, Serial No. 291,965

12 Claims. (Cl. 260—2)

This invention relates to certain new catalysts effective in causing the polymerization of propylene oxide to solid polymeric resins. It also concerns methods of making such catalysts, and their use in polymerization of lower olefin oxides generally.

As is well known, ethylene oxide may be polymerized to a variety of useful products which range from oily liquids to wax-like solids, depending on the degree of polymerization. The same is true of isobutylene oxide which, in the presence of boron trifluoride, is rapidly converted to a white wax. Quite in contrast, propylene oxide has heretofore shown little or no tendency to form solid polymers. This oxide is known to polymerize rapidly in the presence of alkalies or acids, and even explosively with Friedel-Crafts catalysts such as stannic chloride. However, the products have invariably been viscous liquids of a low degree of polymerization.

It has recently been found that by using certain iron compounds as catalysts, propylene oxide may be converted in good yield to solid polymers having melting points above 50° C., often above 70° C., and average molecular weights over 100,000. These polymers are white resinous products with considerable crystallinity, and have specific gravities in the range 1.03 to 1.05. A detailed description of them, and of their manufacture, stabilization, and use, is given in our application Serial No. 291,964, filed simultaneously herewith. Among the catalysts mentioned in that application as useful in making the new polymers are a number of apparently novel complex iron compounds. It is with these compounds, and their use in polymerizing olefin oxides, that the present invention is concerned.

The new catalysts are condensates of propylene oxide with anhydrous ferric chloride or ferric bromide. In general, they correspond approximately to the empirical formula $FeX_3 \cdot (C_3H_6O)_n$ where X is a halogen of atomic number from 17 to 35 and $n$ has a value from about 0.5 to about 3. They appear to be mixtures of complex salts each containing the ferric halide and propylene oxide in a definite molecular ratio. In the case of ferric chloride, analysis and conductiometric studies have tentatively identified the condensates as mixtures of $2FeCl_3 \cdot C_3H_6O$, $FeCl_3 \cdot C_3H_6O$, $FeCl_3 \cdot 2C_3H_6O$ and $FeCl_3 \cdot 3C_3H_6O$. However, it should be understood that these formulas are empirical only, since analysis of the new products shows part of the chlorine to be inorganically bound and part to be organically bound. The new complexes are ordinarily made as solutions or suspensions in organic media and are used as such. However, they may be isolated, ranging from heavy oily liquids to powdery solids, all reddish brown in color and unstable in moist air.

The new catalytic products are made by adding propylene oxide very gradually with agitation to a body of anhydrous ferric halide. Vigorous exothermic reaction occurs in the early stages of addition. The temperature during condensation should be maintained between —80° C. and +60° C., preferably below 30° C., by supplying cooling and by limiting the rate of adding propylene oxide to avoid overheating. Catalytically effective condensates are produced when the propylene oxide is reacted in a proportion of from about 0.5 to about 3 moles of propylene oxide per mole of ferric halide ($FeX_3$). However, as a practical matter in making the complexes, the gradual addition of propylene oxide to the ferric halide is ordinarily continued until the addition of a further small proportion of the oxide results in no further immediate evolution of heat. This point is usually reached when from 2 to 3 moles of propylene oxide have been added per mole of ferric chloride.

To insure good temperature control during formation of the complex catalyst, the condensation is preferably carried out in the presence of an inert non-aqueous diluent. The medium either may be a solvent for the anhydrous ferric chloride or may be a non-solvent suspending medium. Diethyl ether is the preferred solvent both because of its excellent dissolving power and because it tends to limit temperature rise by boiling if excessive evolution of heat occurs. However, ethanol, ethyl acetate, carbon tetrachloride, 2-nitropropane, 1,1-dichloro-1-nitropropane, acetophenone, dichlorodiethyl ether, and triglycol dichloride have all been found operable as solvents. Among the non-solvent media, low-boiling liquid aliphatic hydrocarbons are perhaps most satisfactory, e. g. n-hexane. For ease of operation, solvent media are preferred over non-solvent, mainly because of the rather sticky character of ferric halide suspensions.

The proportion of solvent or non-solvent used is not critical, and may range from zero, better one or more, up to 30 or more parts by weight of medium per part of ferric halide. With diethyl ether and ferric chloride, a ratio of about 5 to 7 parts of the former per part of the latter seems to give optimum results.

When extreme care is taken in making the complex condensates of the invention, they may be used directly, i. e. without purification, as catalysts for the polymerization of olefin oxides. To this end, all traces of moisture, and of chemically combined water as well, should be absent from the anhydrous ferric halide, the condensation medium, and the propylene oxide. The latter should preferably also be freed of aldehyde impurities, as by fractional distillation in contact with alkali metal hydroxide. The condensation is best carried out in a dried vessel, with air excluded, as by means of a purge of dry nitrogen. The resulting product solution or suspension may, if desired, be used as such as catalyst for the polymerization of alkylene oxides. It is preferable, however, to concentrate the active material somewhat, as by evaporating the solvent or suspending medium at reduced pressure. When the removal is continued until the medium is entirely gone, and other volatile materials driven off, the catalyst complex is obtained as a reddish-brown thick liquid or powder. Conveniently, this complex is then redissolved in a powerful solvent, such as acetone, for convenience in handling.

It is also possible, according to the invention, to prepare catalyst complexes by the interaction of ferric halide and propylene oxide carried out with reactants of ordinary purity, e. g. containing up to 0.2 per cent or more of water and aldehyde, without the detailed precautions just mentioned. In this case, however, the complex is less active catalytically unless a purification step is carried out. According to one purification process, the solution or suspension of the impure complex is first warmed under vacuum to remove the medium and other volatiles, and the residue is then dissolved in a solvent, such as acetone. The resulting solution is diluted with a volatile hydrocarbon or halohydrocarbon non-solvent for the complex such as petroleum ether, benzene, carbon tetrachloride or chloroform. This treatment results in precipitation of the complex catalyst, leaving most of the impurities in solution. The complex may then be separated or filtered off, washed with more non-solvent, and dried.

The dried solid complex condensate is fairly stable when stored in dry closed containers and retains at least part of its catalytic activity for a year or more. However, since the activity decreases on aging, it is most desirable, where possible, to prepare the complex only shortly before using it.

The complex ferric halide-propylene oxide complex products prepared as explained above are effective catalysts for the conversion to solid polymers not only of propylene oxide but also of the other lower olefin oxides i. e. those containing no more than four carbon atoms per molecule, e. g. ethylene oxide, chloropropylene oxide, and isobutylene oxide. They are also effective in catalyzing the copolymerization of propylene oxide or other lower olefin oxide with up to equal parts by weight of a different organic epoxide. Of the latter, ethylene oxide, chloropropylene oxide, isobutylene oxide, 1,2-epoxybutane, the two 2,3-epoxybutanes, and styrene oxide (phenyl ethylene oxide) have all proved suitable. Polymerization may be carried out en masse or in a non-aqueous inert solvent or suspending medium.

In making solid polymers and copolymers using the catalyst complexes of the invention, the monomer or mixture of monomers and the catalyst may simply be charged together into a closed vessel and heated until polymerization is complete. The mixture is advantageously agitated during polymerization. The proportion of complex catalyst used is small, being satisfactorily from 0.1 to 5 per cent by weight of the oxide to be polymerized, preferably 0.5 to 2 per cent. In general, the maximum yields of high molecular weight solid polymer are obtained with the lowest operable proportion of catalyst within the range given. Polymerization temperature is in the range 40° to 150° C., with 70° to 100° C. being preferred, and 80° about the optimum. Below 70° C. the polymerization time becomes unduly long, whereas at much above 100° C. the yield of high molecular weight polymer is reduced. Within the 40° to 150° temperature range, the polymerization time may vary from 3 to 200 hours, the shorter times being at the higher temperatures. In the preferred range of 70° to 100° C., a time of 40 to 180 hours is usually sufficient to insure substantial completion of the reaction.

Instead of effecting mass polymerization as just described, the procedure may be carried out with the oxide monomer, catalyst, and product all dissolved in an inert solvent. In general, roughly equal proportions of monomer and solvent are used. Preferred solvents are diethyl ether, diisopropyl ether, petroleum ether, benzene, and n-hexane. It is advantageous to chose a solvent which boils at about polymerization temperature, and to heat the solution to induce gentle reflux, thereby insuring close control of temperature. The presence of a solvent reduces slightly the rate of polymerization but favors conversion of a somewhat higher proportion of the monomer to the desired solid polymer.

The crude product resulting from the polymerization or copolymerization process contains, in addition to the desired solid resin, whatever liquid polymers may have formed, residual oxide monomer, such solvent as was employed, and catalyst residue. This crude material is first warmed if necessary to vaporize off the unreacted monomer and the solvent. The resulting product, a tough rubbery mass of brown color, is treated in any convenient way to remove the iron-containing catalyst residue and to separate the desired solid resin from liquid polymer present. Preferably, the rubbery mass is dissolved in several volumes of solvent for the polymer, e. g. hot acetone, and the solution acidified, as with hydrochloric acid, to convert the iron-containing catalyst to soluble iron salts. The resulting clear yellow solution is then chilled to a temperature sufficiently low to cause the solid polymer present to crystallize out of solution, e. g. below −20° C. The crystalline material may then be further purified by recrystallization from acetone, yielding white solid polymer having a molecular weight sufficiently high that its softening point is over 50° C.

In an alternative purification step, the acetone solution of the crude polymeric product may be treated with a small proportion of water to convert the iron-containing complex catalyst to an iron hydroxide precipitate. The latter may be removed by filtration, after which the polymer is recovered by crystallization.

The following examples will further illustrate the invention but are not to be construed as limiting its scope.

Example 1

A complex catalyst was prepared by dissolving 10 parts by weight of anhydrous ferric chloride in 50 parts of diethyl ether and adding gradually 10 parts of liquid propylene oxide while stirring and cooling to keep the temperature below 60° C. When condensation ceased, the product was warmed under vacuum to remove volatile matter, leaving a semi-solid brown residue.

This catalyst residue was charged into a glass-lined stirring autoclave together with 1000 parts of liquid propylene oxide. The mixture was heated at 80° C. with stirring for 88 hours, until polymerization was complete. There was obtained 940 parts of a brown rubbery solid polymer. This was dissolved in hot acetone and sufficient concentrated hydrochloric acid was added to convert the iron-complex present to soluble ferric chloride. The solution was chilled to −20° C., whereupon a solid polymer crystallized out of solution and was separated by filtration. This polymer was then recrystallized twice from acetone, there being finally obtained 250 parts of a fluffy white solid.

The white solid had a specific gravity 1.03 and a melting point of 70° C. Its molecular weight, as measured by a light-scattering method, was approximately 135,000. The polymer was soluble in hot acetone, hot methanol, ethanol, dioxane, benzene, toluene, carbon tetrachloride, tetrahydrofuran, methyl ethyl ketone, nitromethane, and isophorone. It did not dissolve, but swelled to a gel, in ether and ethyl acetate, and was insoluble in dimethyl formamide, monoethanolamine, lard, and peanut oil. It was resistant to water and to aqueous acids and alkalies. A 4 per cent by weight solution of the polymer in benzene had a viscosity at 18° C. of 14.8 centistokes, corresponding to a specific viscosity of 19.4.

Example 2

A series of polymerizations of propylene oxide in various solvents was carried out using as catalyst in each case 2.0 per cent by weight of a ferric chloride-propylene oxide complex prepared as in Example 1. The solvents used, in approximately equal proportion by volume to the liquid propylene oxide were benzene, petroleum ether, diethyl ether, diisopropyl ether, and n-hexane. Polymerization was in all instances at 80° C. for 163 hours. In every case, the propylene oxide was entirely converted to polymeric products. Each crude product was treated as in the previous examples to isolate a white solid polymer having a melting point above 50° C. The percentage yield of solid polymer was as follows: benzene, 26.6; petroleum ether 27.2; diethyl ether, 29.2; diisopropyl ether, 26.7; and n-hexane, 25.1.

Example 3

A series of copolymerizations of propylene oxide with other olefin oxides was carried out using as catalyst a ferric oxide-propylene oxide complex prepared as in Example 1. In all cases, the concentration of catalyst was 2.0 per cent by weight of the total monomeric material, and copolymerization was carried out for 221 hours at 80° C. In every instance the solid copolymer was isolated from the crude reaction product by the crystallization procedure of Example 1 and found to have a melting point above 50° C. Each was stabilized by mixing with 1 to 2 per cent by weight of 2.2-methylene bis(4-methyl-6-tertiary butyl phenol). Each stabilized copolymer was molded into a film, which was then oriented by stretching up to the limit of easy stretch, about 300 per cent.

The following table gives the identity and proportion of the comonomer in per cent by weight (balance being propylene oxide), the yield of solid copolymer, and the tensile strength (pounds per square inch) of the oriented film.

| Comonomer | Percent | Yield | Film Strength |
|---|---|---|---|
| Ethylene Oxide | 6.1 | 16.5 | 7,500 |
| Do | 10.5 | 14.4 | 8,800 |
| Epichlorohydrin | 5.4 | 20.4 | 5,400 |
| Do | 10.0 | 12.8 | 6,000 |
| Styrene Oxide | 5.1 | 17.0 | 7,100 |
| Do | 10.3 | 14.1 | 5,600 |

Example 4

In preparing a complex catalyst, 10 grams of anhydrous ferric chloride was first dissolved in 175 ml. of diethyl ether. To this solution there was added slowly 60 ml. of liquid propylene oxide, the whole being stirred and cooled to maintain a temperature of 25° C. When addition was complete, volatile components were removed by evaporation under vacuum at room temperature. The residue, about 40 ml. of an oily red-brown material, was dissolved in 50 ml. of acetone. This solution was then fractionated by adding 400 ml. of petroleum ether, which caused separation of a layer of about 40 ml. of a heavy red-brown oil. This oil was redissolved in an equal volume of acetone to provide a solution of the active catalyst.

The catalyst solution was used in a series of copolymerizations of propylene oxide with various proportions by weight of other olefin oxides as indicated in the following table. The concentration of catalyst in all cases was 2.0 per cent by weight. Copolymerization was at 80° C. for the times indicated. In each case, a solid copolymer was separated by fractional crystallization from acetone as in the previous examples. The yield of solid copolymer is given in the table. Each copolymer had a softening point above 50° C. and was molded into a film which was oriented by stretching.

| Comonomer | Percent of Total Monomer | Time (Hours) | Yield |
|---|---|---|---|
| Isobutylene Oxide | 10.3 | 112 | 29.8 |
| Do | 50 | 496 | 11.4 |
| 1,2-Epoxy Butane | 10.7 | 113 | 25.5 |
| Do | 50 | 496 | 6.7 |
| Trans 2,3-Epoxy Butane | 10.4 | 112 | 28.9 |
| Do | 52 | 496 | 11.8 |
| Cis 2,3-Epoxy Butane | 10.3 | 112 | 30.2 |

*Example 5*

A charge of 100 grams of anhydrous ferric chloride was dissolved in 100 ml. of diethyl ether. To this solution propylene oxide was added gradually with agitation, the whole being cooled to maintain room temperature. A total of 55 ml. of propylene oxide was added, at which time no further heat evolution occurred. The final solution was evaporated under vacuum at room temperature, leaving a viscous red-brown liquid containing much red-brown sediment. The entire residue was dissolved in 100 ml. of acetone containing 0.5 per cent water to make about 200 ml. of a dark red solution. Half of this solution was extracted with 1500 ml. of petroleum ether, leaving a reddish oil raffinate. The other half of the solution was shaken with 1500 ml. of n-hexane, again leaving a reddish oil raffinate. The two oily raffinates, amounting to about 200 ml., were combined, washed with 1000 ml. of n-hexane, and clarified by filtration. The clear oily product was then placed under vacuum at room temperature to remove volatile matter, leaving a reddish-brown powder. On analysis, it was found to contain 20.9 per cent iron, 32.6 per cent inorganic chloride, and 2.1 per cent organic chloride. On heating at 150° C. to constant weight the weight loss was 33.0 per cent; on ignition at 800° C. it was 71.4 per cent.

A 63.7 g. quantity of this catalyst was transferred to a stirring autoclave, which was thus purged with nitrogen. A 7.0 pound batch of propylene oxide was then introduced, and polymerization was carried out at 80° C. under autogenous pressure gradually falling from 44 pounds per square inch gauge to atmospheric pressure over 82 hours. The resulting polymer was a soft semi-solid mass containing a high proportion of solid polymeric propylene oxide.

What is claimed is:

1. As a new product, a condensation product of a ferric halide and propylene oxide corresponding to the empirical formula $FeX_3 \cdot (C_3H_6O)n$, where X is a halogen of atomic number from 17 to 35 and $n$ has a value from 0.5 to 3.

2. A catalyst for the polymerization of olefin oxides to solid polymers consisting essentially of a condensation product of anhydrous ferric chloride and propylene oxide, and corresponding approximately to the empirical formula $FeCl_3 \cdot (C_3H_6O)n$ in which $n$ has a value from about 0.5 to about 3.

3. A product according to claim 2 in which the value of $n$ is at least 2, the product being isolated as a reddish-brown solid.

4. A method of preparing a catalyst for the polymerization of olefin oxides to solid polymers which comprises slowly adding from 0.5 to 3 moles of propylene oxide to one mole of an anhydrous ferric halide of the class consisting of ferric chloride and ferric bromide while maintaining the temperature of the reaction mixture between —80° and 60° C.

5. A method of preparing a catalyst for the polymerization of olefin oxides to solid polymers which comprises gradually introducing from 0.5 to 3 moles of propylene oxide with agitation into contact with one mole of anhydrous ferric chloride while maintaining the temperature of the mixture between —80° and 30° C., such addition being continued until the addition of a further small proportion of propylene oxide causes no further immediate evolution of heat.

6. A process according to claim 5 wherein the reaction is carried out in the presence of an inert non-aqueous diluent.

7. A process according to claim 6 wherein the diluent is diethyl ether.

8. A process according to claim 6 wherein the resulting ferric chloride-propylene oxide condensate is separated from the reaction mixture in solid form.

9. A process of polymerizing a lower olefin oxide to form a solid polymer which comprises mixing it with a small proportion of a complex catalyst condensate of a ferric halide and propylene oxide and corresponding to the empirical formula $FeX_3 \cdot (C_3H_6O)n$ in which X is a halogen of atomic number from 17 to 35 and $n$ has a value from 0.5 to 3, and heating the mixture at a temperature of 40° to 150° C. for a time sufficient to effect polymerization.

10. A process of making solid homopolymeric propylene oxide which comprises mixing propylene oxide with from 0.1 to 5 per cent by weight of a previously prepared complex catalyst condensate of ferric chloride and propylene oxide containing approximately from 2 to 3 moles of combined propylene oxide per mole of combined ferric chloride ($FeCl_3$), heating the resulting mixture at a temperature of 70° to 100° C. for a time sufficient substantially to complete polymerization, and separating solid polypropylene oxide from the resulting product.

11. A process according to claim 10 in which heating is carried out for from 40 to 180 hours at about 80° C.

12. A process of making a solid copolymer of propylene oxide with up to an equal proportion by weight of another oxide of the class consisting of ethylene oxide, chloropropylene oxide, isobutylene oxide, 1,2-epoxybutane, the two 2,3-epoxybutanes and styrene oxide which comprises mixing the monomers with from 0.1 to 5 per cent by weight of a previously prepared condensate of ferric chloride and propylene oxide containing approximately 2 to 3 moles of combined propylene oxide per mole of combined ferric chloride ($FeCl_3$), heating the resulting mixture at a temperature of 70° to 100° C. for a time sufficient substantially to complete polymerization, and separating solid copolymer from the resulting product.

References Cited in the file of this patent

UNITED STATES PATENTS 2,327,053    Marple et al.    Aug. 17, 1943